United States Patent

[11] 3,634,053

| [72] | Inventors | Donald L. Klass<br>Barrington;<br>Carl D. Landahl, Chicago, both of Ill. |
|---|---|---|
| [21] | Appl. No. | 25,850 |
| [22] | Filed | Apr. 6, 1970 |
| [45] | Patented | Jan. 11, 1972 |
| [73] | Assignee | Institute of Gas Technology<br>Chicago, Ill. |

[54] ODORIZATION METHOD AND APPARATUS
16 Claims, 4 Drawing Figs.

[52] U.S. Cl.................................................. 48/195,
137/3, 137/7, 137/88, 137/93, 137/604, 261/27,
261/104, 261/DIG. 17
[51] Int. Cl.......................................................... C10j 1/28
[50] Field of Search.................................48/195, 196
FM; 261/DIG. 17, 27, 104; 137/3, 7, 88, 93, 604;
239/49, 50

[56] References Cited
UNITED STATES PATENTS

| 1,930,848 | 10/1933 | Ashley et al. | 48/195 X |
| 2,050,565 | 8/1936 | Edwards et al. | 48/195 X |
| 2,058,508 | 10/1936 | Rolle | 48/195 X |
| 2,166,370 | 7/1939 | Putnam et al. | 48/195 X |

*Primary Examiner*—Joseph Scovronek
*Assistant Examiner*—D. G. Millman
*Attorney*—Dominik, Knechtel & Godula ABSTRACT: Odorant is metered into a flowing gas stream by sensing the rate of flow of the stream or the odorant concentration of the stream and reporting said rate or concentration as an output signal to an actuating means joined to a membrane assembly having a gas-permeable membrane part immersed in the stream. Odorant within the assembly is permeated through the membrane, and into the stream in response to said output signal.

PATENTED JAN 11 1972 3,634,053

INVENTORS
Donald L. Klass
Carl D. Landahl
BY Dominik, Knechtel & Godula
ATTYS.

ODORIZATION METHOD AND APPARATUS

This invention relates to improved methods and apparatus for delivering precise and controllable amounts of odorants to a gas stream, such as a natural gas stream.

Natural gas distributed for fuel and industrial use contains odorants comprised most commonly of low-molecular-weight organic sulfur compounds such as mercaptans and sulfides, for example, thiophane, dimethyl sulfide, isopropyl mercaptan n-propyl mercaptan, and others. Such odorants may be used alone or in various mixtures. Reference will be made herein to tertbutyl mercaptan (TBM), which is a compound now in common use as an odorant for natural gas. TBM is a volatile liquid at room temperature, but is used as an odorant gas in a flowing natural gas stream. These compounds are effective at very low concentrations, and warn of leaks or equipment failure. In the case of TBM, for example, the odorant concentration generally desired is approximately 3/4 lb./million c.f.

Numerous different methods and apparatus presently are used to deliver odorants to a flowing natural gas stream, however, most if not all are objectionable, for one reason or another. Some are extremely complex and, for this reason, also costly and difficult to operate and maintain. Others are relatively simple, but they again are difficult to operate. The most critical objection to any of these prior systems is the inability to precisely and continuously meter a given amount of odorant to the natural gas stream. Industry therefore, has been seeking an improved method and apparatus for adding these odorants.

According to the present invention, precise metering of gaseous and liquid odorants into a flowing natural gas stream is accomplished by permeation of the odorant through a permeable membrane which is immersed in the natural gas stream. A sensing device is employed to detect changes in the desired levels of said odorant in the stream by sensing changes in the flow rate of the natural gas, or concentration of odorant in the gas. Variable amount of odorant is then added, in response to changes, that is, the input of odorant into the stream is proportional to the flow rate or the odorant concentration. The amount of odorant delivered may, therefore, be increased, decreased, or stopped. The rate of permeation of the odorant is automatically adjusted in an appropriate manner to maintain the preestablished odorant level in accordance with changing levels of the odorant in the natural gas stream.

The odorant system, fully described below, offers numerous advantages not available with present systems including, for example, low cost, simplicity of operation, little or no maintenance, and the elimination of most, if not all, moving mechanical parts. In addition, the odorant system is capable of operation over a broad temperature range of $-50°$ to $200°$ F., however, the preferred operating range is within a temperature range of $30°$ to $70°$ F., which corresponds to the temperatures generally encountered in dealing with natural gas pipelines. The odorant system also is readily adaptable to commonly employed types of natural gas pipeline systems, and local distribution systems. The operating ranges of the pressure, flow rate and pipe diameters are, respectively, on the order of 0.3–1,000 p.s.i.g.; 200–50,000 c.f./hr.; and 2–24 inches. While particular reference is made herein to a natural gas stream the principles of the invention are understandably applicable to introducing odorant into other confined gas streams. These may include liquified natural gas (LNG) or liquified propane gas (LPG), or still other liquified or room temperature liquid hydrocarbon.

Accordingly, it is an object of the present invention to provide improved methods and apparatus for delivering precise and controllable amounts of odorants to a flowing gas stream, as required for predetermined detection levels.

Another object is to provide improved methods and apparatus of the above type wherein metering of the odorants is accomplished by permeating the odorant through a membrane interface, disposed in the natural gas stream, in response to changes in desired or predetermined odorant levels in the gas stream.

Still another object is to provide improved methods and apparatus of the above type including means for automatically adjusting the rate of permeation of the odorant, in accordance with changes in the flow rate of natural gas, or the concentration of odorant, to maintain a preestablished odorant level in the flowing natural gas stream.

A still further object is to provide an improved apparatus which is of low cost, simple in operation, requires little or no maintenance, and contains few, if any, moving mechanical parts, which apparatus delivers metered amounts of odorant to a natural gas stream.

Still another object is to provide improved methods and apparatus which are operable over a wide range of pressure, gas flow rates and pipe diameters.

For a fuller understanding of the nature and objects of the invention, reference should be had to the following detailed description taken in connection with the accompanying drawings in which.

Similar reference characters refer to similar parts throughout the several views of the drawings.

Figure 1:
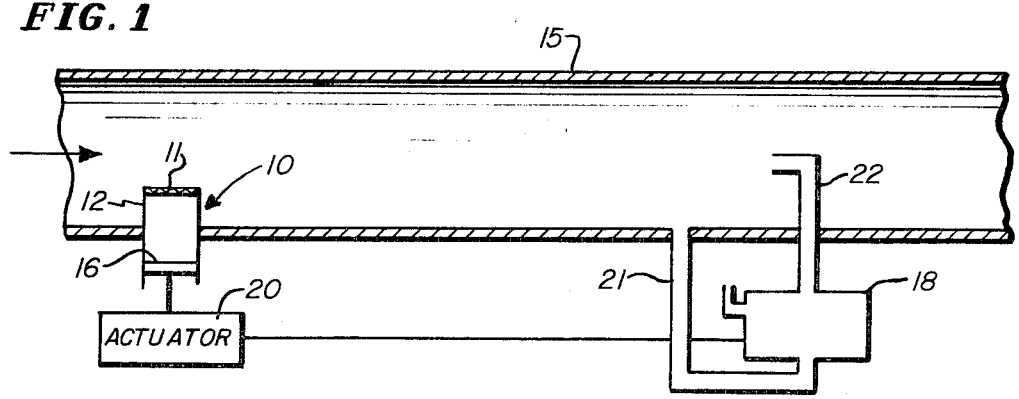
FIG. 1 is a block-diagram-type illustration of an odorizing apparatus exemplary of the invention.

As indicated above, the precise metering of gaseous and liquid odorants into a flowing natural gas stream pipeline is accomplished by permeating an odorant through a membrane which is immersed in the natural gas stream. Numerous different membrane types and configurations may be used such as coils, tubes, sheets, cones, spheres, and the like. Different odorants can be employed, and odorizing apparatus can be of numerous different constructions, as explained more fully below.

A particular odorant and membrane combination is selected by considering the permeation rate of that odorant through that membrane. The permeation process is believed to include features of diffusion and solubility of the odorant in the membrane. See, for example, Li, N. N. and Long, R. B., *AICHE Journal* 15, No. 1, 73–80; Sheehan, C. J. and Bisio, A.L., *Rubber Chemistry and Technology* 39, No. 1, 149–192.

The rate of permeation through a membrane may be represented by Fick's Law:

$$q = KA(\Delta P)/\delta$$

where:

$q$ = flow rate of odorant through the membrane, cm.$^3$ (STP)/sec.

$K$ = permeability constant, (cm.$^3$ (STP) cm.)/ (cm.$^2$ sec. cm. Hg)

$A$ = membrane area, cm.$^2$ $\Delta P$ = pressure of differential of odorant across the membrane, cm. Hg $\delta$ = thickness of membrane, cm.

The permeability constant $K$ is a specific quantity for a given odorant and membrane, and can be determined by monitoring the odorant permeation through a membrane, using a known variable volume-constant pressure method, to which further reference will be made hereinafter.

It can be seen that the flow rate of odorant, or rate of permeation, of an odorant through a membrane is directly proportional to the membrane area and the pressure differential of odorant across the membrane, and is inversely proportional to the thickness of the membrane. Accordingly, the odorizing apparatus can be constructed such that the permeation rate of odorant is a function of the amount of natural gas flowing in the pipeline. Odorizing apparatus of this type can include a sensing device which detects changes in the natural gas flow rate and which, upon detecting an increase or decrease in the flow rate, provides a corresponding output signal. As one example of such sensor a "hot wire" may be placed in the gas stream. The temperature of the wire and its resistance, will change as the flow rate increases. This change in resistance may be picked up by a bridge and the amplified current may be used for drive means, such as a solenoid piston or the like, to cause the odorant to permeate the membrane. This output signal can be coupled to a membrane assembly including means responsive to these output signals to change the pressure applied to the odorant in the membrane assembly. This change in pressure, in turn, results in an increase or decrease in the permeation rate of odorant into the natural gas stream.

Changes in the desired or predetermined levels of odorant may also be sensed by detecting changes in odorant concentration in a sample of the gas stream. Various known sensing techniques to detect sulfur levels may be employed, which utilize apparatus such as an ITT Barton Model 286 Electrolytic for bromine electrochemical titration of total sulfur; various chromatographic apparatus employing argon or flame ionization detection and apparatus in which sulfur is hydrogenated, and then the reduced sulfide is reacted with a reagent to form a methylene blue dye. The sulfur content is then determined by measuring the color development.

It will be understood that reference to "detecting changes in predetermined odorant levels" means determining change in flow rate of the stream or changes in the odorant concentration. The output signal may simply report a given change, or it may be a modulated output signal responsive to different changes. Both meanings are intended by the term "output signal."

The odorizing apparatus can be of a construction such that the permeating rate of odorant is not dependent upon pressure changes in the membrane system, but is, instead, dependent upon the surface of the membrane exposed to the natural gas stream or, alternatively, the thickness of the membrane exposed to the natural gas stream. The odorizing apparatus also can employ two or more membranes, each of which is of a different permeability. These membranes are displaced so as to expose one or the other, or both, to the natural gas stream. The membrane also can be periodically inserted and removed from the natural gas stream, or the membrane can be in the form of a flexible container which is changed in size as the pressure within the pipeline changes, to thereby vary the permeation rate of odorant into the natural gas stream. The membrane may have the embodiment of a moving cone which exposes varying areas during movement to accordingly vary the odorant permeation into the stream. Still other embodiments will occur to practitioners.

The permeability constant $K$, as indicated above, can be determined by measuring the odorant permeated through the membrane. One measurement method is called the variable volume-constant pressure method. This method uses an elevated fixed pressure of the odorant on the input side of a diffusion cell in which a membrane is placed on a support, such as several layers of filter paper or a stainless steel mesh screen. The supported membrane is clamped between two halves of the cell, which provide a small space on each side of the membrane. Conduits communicate with each side, some with valves for gas pressure control. The odorant is delivered at elevated pressures on an input side, and it passes through the membrane to an output side maintained at a fixed pressure, generally atmospheric by way of a conduit vent. As the odorant permeates through the membrane, it acts upon a small slug of mercury in an open capillary tube attached to the output side and vented to the atmosphere. The displacement of the mercury slug with time is measured. The permeability, adjusted to STP, is computed directly from these measurements under steady-state conditions by:

$$k = (x A_s \delta f)/(t A \Delta p)$$

where:
$K$ = permeability, (cm.$^3$ (STP) cm.)/(cm.$^2$ sec. cm. Hg)
$x$ = mercury slug displacement, cm.
$A_s$ = mercury slug cross-sectional area, sq.cm.
$\delta$ = membrane thickness, cm.
$f$ = correction factor to convert to STP
  3.592 x output pressure (cm.Hg) / output temp. (K.°)
$t$ = time, seconds
$A$ = membrane area, sq.cm.
$\Delta p$ = input pressure less output pressure, cm. Hg Various membranes may be employed such as polytetrafluoroethylene, silicone rubber, polyvinylchloride, gelatin and the like. The permeability of the membranes may also be related to the solubility parameters of the odorant and the membrane as calculated by the method of Small, P. A., J. Appl. Chem. 3,71–80 (1953). For example, the calculated solubility parameter of TBM is 7.61. The experimentally determined solubility parameter of silicone rubber is 7.3 and of polyvinylchloride is 9.6. In general, solubility parameters of membranes and odorants which are similar provide high permeation rate combinations. Thus, TBM should have a higher permeation rate in silicone rubber than in polyvinylchloride. Measurements show that the permeability factor of TBM in silicone rubber is about 15 times greater than in polyvinylchloride.

Several odorizing apparatus exemplary of the various different constructions which can be employed can now be described. The illustrated apparatus utilizes a silicone rubber membrane, 0.5 mil thick, and employs TBM as the odorant metered into the gas flow pipelines. The apparatus illustrated in FIG. 1 can be seen to include an enclosed membrane assembly 10 in the form of a cylinder 12 having a sheet-type, film membrane 11 affixed to its one end. The cylinder 12 is disposed within the pipeline 15, so that the membrane 11 is immersed in the natural gas stream flowing through the pipeline 15. The cylinder 12 functions as a reservoir for the odorant, and means (not shown) are provided for maintaining the supply of odorant within the reservoir. Pressure means 16, such as the piston illustrated, are disposed within the cylinder 12, and are operated to vary the pressure exerted on the odorant within the cylinder 12, to thereby change the rate of permeation of odorant into the natural gas stream in the pipeline 15. Alternatively, the pressure means can be, for example, a bellows which is increased or decreased in volume to vary the pressure exerted on the odorant within the cylinder 12.

The odorizing apparatus 12 also includes a fluidic amplifier 18 which is coupled to and functions to operate an actuator 20 associated with the cylinder or odorant reservoir 12 to, in turn, operate the pressure means 16. The fluidic amplifier has a static pressure tube 21 coupled to it which has its open end disposed within the pipeline 10 so as to be responsive to static pressures. This static pressure tube 21 in conjunction with the fluidic amplifier 18 establishes a static pressure within the system.

The fluidic amplifier 18 also has a pitot tube coupled to it which likewise has its end disposed within the pipeline 10 responsive to dynamic pressures. The flowing gas in the pipe line 10 exerts a dynamic pressure in the direction of flow, separate from its static pressure, which pressure is termed the pitot pressure and is proportional to the square of the flow rate of the natural gas. The pitot pressure operates the fluidic amplifier 18 to cause it to modulate its output signal so as to cause the actuator 20 to operate the pressure means 16 to increase or decrease the pressure exerted on the odorant in the reservoir, in accordance with the flow rate of the natural gas stream in the pipeline 10.

In constructing such a system or apparatus, the odorant to be used is established, and then the permeability constant $K$ of the selected membrane is determined. Thereafter, surface area and thickness parameters of the membrane are established. Having established this, the output signal of the fluidic amplifier 18 is adjusted so that it operates the actuator 20 to, in turn, operate the pressure means 16 to exert the necessary pressure on the odorant reservoir 12, to establish the necessary rate of permeation of odorant into the natural gas stream. As the flow rate of natural gas is increased or decreased, the change will be detected by the fluidic amplifier to automatically compensate for change so that a precise metered amount of odorant always is permeated into the natural gas stream.

Figure 2:
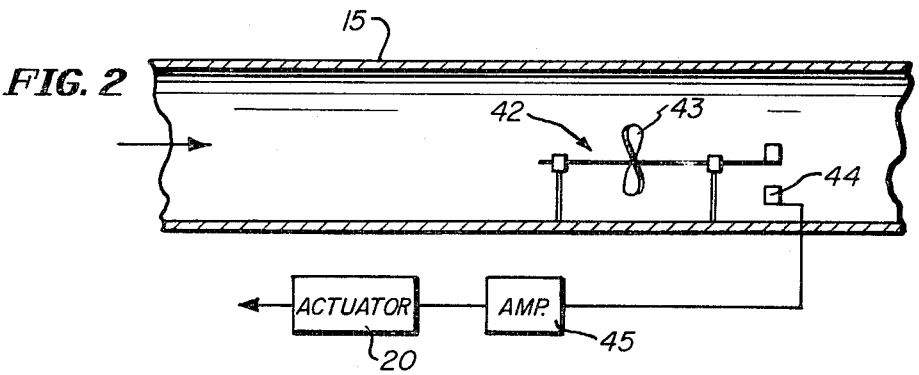
FIG. 2 is a similar illustration of an odorizing apparatus exemplary of a second embodiment of the invention.

In FIG. 2, there is illustrated still another odorizing apparatus wherein the fluidic amplifier is replaced with a turbine blade assembly 42 which is fixedly installed within the pipeline. In this arrangement, the flow of natural gas in the pipeline causes the turbine blade 43 to rotate at a rate proportion to the gas flow rate. A speed pickup assembly 44 is coupled to the turbine assembly 42, and senses the rate of rotation of the turbine blade 43. The output of the speed pickup assembly 44 is coupled to and operates an amplifier 45 which, in turn, operates the actuator 20. The latter again functions to change the pressure applied to the odorant in the cylinder or odorant reservoir 12, to thereby increase or decrease the permeation rate of odorant into the natural gas stream, in accordance with the flow rate of the natural gas in the pipeline 10, in the manner described above.

In the foregoing embodiment, the sensing means is shown in the downstream location, and the membrane is immersed in the gas flow in the upstream location, but this relationship is not important when determining changes in the flow rate. When the sensing means is an odorant sensor, it is important that it be positioned downstream and the membrane be positioned upstream so that downstream detection will direct upstream correction of the odorant level.

Figure 3:
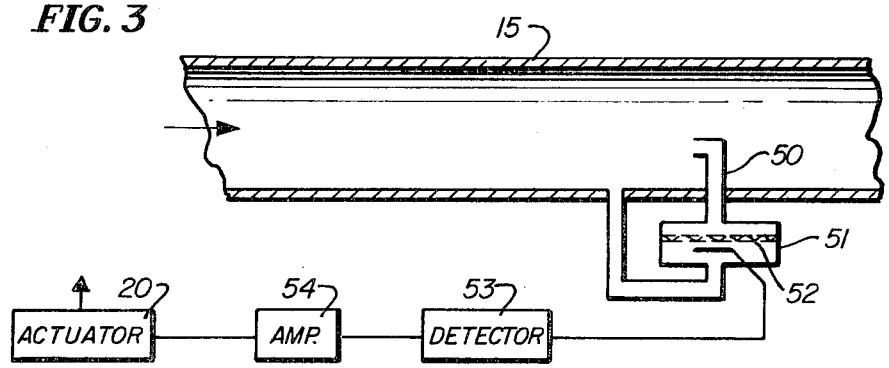
FIG. 3 is another similar illustration of still another type of odorizing apparatus.

In FIG. 3, there is illustrated still another odorizing apparatus employing a pitot pressure tube 50 and a transducer diaphragm 51. In this case, the pitot pressure tube 50 detects any changes in the flow rate of the natural gas stream in the pipeline, and exerts a corresponding force on the diaphragm 52 of the transducer 51. The displacement of the diaphragm 52 results in a variation in capacitance which is detected by a detector 53, amplified by an amplifier 54 which output is coupled to the actuator 20. The apparatus, again, is correspondingly calibrated or adjusted so that the actuator 20 operates the pressure on the odorant in the cylinder or odorant reservoir 12, to maintain the desired established rate of permeation of odorant into the natural gas stream.

Figure 4:
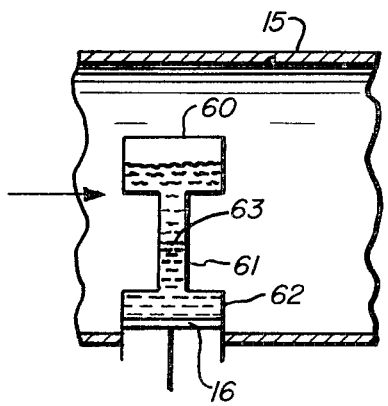
FIG. 4 is an illustration of a membrane assembly which can be substituted for the membrane assembly of FIGS. 1–3.

In FIG. 4, there is illustrated a membrane assembly which can be substituted for and used in place of the membrane assembly described above, in any one of the three different odorizing apparatus. An odorant reservoir 60 is joined to a communicating, continuous membrane wall 61 and to another reservoir 62 which contains a nonpermeable liquid. The odorant and liquid are immiscible so that their respective volumes are maintained separate. The communicating continuous membrane wall may be in the form of a coil. Pressure means, 10, illustrated as a piston 16, is disposed within the reservoir 62, and is operated by means of an actuator 20 such that a change of flow rate of the natural gas stream is sensed, in the manner described above, to operate the actuator 20 to exert a pressure on the nonpermeating liquid in the reservoir 62. This pressure causes a change in the position of the interface 63 between the nonpermeating liquid and the permeating odorant in the communicating membrane wall 61, to thereby vary the membrane surface area exposed to odorant. This variation, in turn, varies the rate of permeation of odorant into the natural gas stream.

Figure 5:
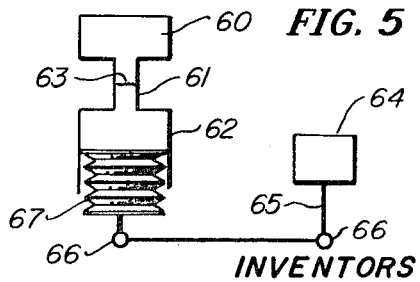
FIG. 5 is a highly diagrammatic representation of a temperature correction device useful with odorizing apparatus.

Increases in temperature will, of course, tend to increase odorant permeation, and such effects may be counteracted by means such as those diagrammatically illustrated in FIG. 5, such means being disposed in a gas pipeline, or the like. No temperature correction device is indicated in association with a membrane assembly of the type shown in FIG. 4.

A temperature-sensing material 64 may be in the form of a bimetallic which expands with temperature increase. The material 64 is joined by linkage 65 and pivots or fulcrums 66. The linkage and pivots are so interrelated that expansion of material 64 will cause piston bellow 67 to increase in volume to thereby operate to neutralize temperature effect. Decrease in temperature will cause the temperature-sensing material 64 to contract and the bellow to decrease in volume to thereby expose additional amounts of odorant to the membrane. It will be appreciated that the piston bellows 67 will also be independently actuated in response to output signals corresponding to odorant concentration or flow rate, as previously described.

The claims of the invention are now presented.

What is claimed is:

1. A method for metering controllable amounts of an odorant from an enclosed membrane assembly, at least a part thereof being a permeable membrane immersed in a flowing gas stream, said membrane having a selected permeation rate for the odorant in the assembly, said gas stream being substantially maintained with a predetermined level of said odorant, including the steps of
    sensing changes in desired odorant levels of the gas stream,
    reporting such changes in the form of an output signal to operate actuating means, and
    altering the rate of said odorant passing from enclosed assembly permeating through said membrane in accordance with the operation of said actuating means to thereby meter a controlled amount of the odorant through the membrane, and into the gas stream at a selected permeation rate.

2. A method which includes the steps of claim 1 above wherein the gas stream is natural gas flowing in a pipeline.

3. A method which includes the steps of claim 2 above wherein the change in the odorant level is determined by sensing static and dynamic pressure of the gas stream, and the output signal is modulated by means responsive to changes in the dynamic pressure.

4. A method which includes the steps of claim 2 above wherein the changes in the odorant level are determined by sensing the rotational rate of a turbine assembly in the gas flow, and said rotational rate is reported as a modulated signal to actuate a pressure altering means located in the membrane assembly.

5. A method which includes the steps of claim 2 above in which the membrane assembly includes an immiscible liquid system comprising a nonpermeable fluid which forms an interface with the permeable odorant in a communicating permeable membrane walled assembly, and further including the steps of moving the liquid system in the membrane assembly to move said interface and thereby vary the membrane surface area exposed to the permeable odorant.

6. A method which includes the steps of claim 2 above wherein changes in the odorant level are determined by sensing the odorant concentration at a downstream location in the gas stream, and operating said actuation means to meter a controlled amount of odorant into the gas stream by means of said enclosed membrane assembly at an upstream location.

7. A method which includes the steps of claim 2 above, wherein the odorant is tert-butyl mercaptan 8. A method which includes the steps of claim 7 above, wherein the membrane is silicone rubber.

9. An apparatus for delivering a metered amount of an odorant into a flowing gas stream to substantially maintain the odorant level therein, including
    sensing means exposed to the flowing gas to detect changes in the desired odorant level,
    means for delivering an output signal in accordance with detections of said sensing means,
    an enclosed permeable membrane assembly having a permeable membrane on at least a portion thereof immersed in said flowing gas stream, a fluid odorant in said membrane assembly, and actuating means in said assembly for changing the rate of fluid odorant movement through said permeable membrane, and
    said actuating means being responsive to said output signal for changing the rate of fluid odorant through the membrane in the assembly.

10. An apparatus which includes the features of claim 9 above, wherein the gas is natural gas flowing in a pipeline.

11. An apparatus which includes the features of claim 9 above, wherein the sensing means includes a static pressure tube, and a pitot pressure tube exposed to the gas flow, and means outside said gas stream to detect changes in the pitot pressure, and to send out a correspondingly modulated signal to means to actuate said movement of fluid odorant through the membrane in the assembly.

12. An apparatus which includes the features of claim 9 above, wherein said means deliver said output signal as a modulated output signal.

13. An apparatus which includes the features of claim 12 above wherein said sensing means is a flow rate sensor.

14. An apparatus which includes the features of claim 12 above, wherein said sensing means is an odorant concentration sensor.

15. An apparatus which includes the features of claim 12 above wherein the membrane assembly includes a cylinder, a piston operative in one end of the cylinder to change the pressure of the odorant therein, and a permeable membrane mounted over the opposite end of the cylinder, which is immersed in said gas flow.

16. An apparatus which includes the features of claim 12 above, wherein the membrane assembly includes a reservoir for a nonpermeable fluid at one end, a reservoir at the other end for said permeable odorant and an intermediate communicating, continuous permeable membrane walled chamber, said nonpermeable and permeable fluids being immiscible and forming an interface therebetween, said membrane walled chamber being immersed in the gas flow, and a piston member engaging the nonpermeable fluid reservoir for moving the interface to vary the membrane area exposed to the permeable odorant.

* * * * *